United States Patent [19]

Renk

[11] 4,229,056

[45] Oct. 21, 1980

[54] BEARINGS (BEARING THRUST LUBRICATION)

[75] Inventor: Richard J. Renk, Winona, Minn.

[73] Assignee: Gladys D. Miller, Winona, Minn.

[21] Appl. No.: 14,944

[22] Filed: Feb. 26, 1979

Related U.S. Application Data

[63] Continuation of Ser. No. 830,074, Sep. 2, 1977, abandoned.

[51] Int. Cl.³ ............................................. B61F 17/06
[52] U.S. Cl. ................................ 308/99; 308/87 R; 308/132; 308/171
[58] Field of Search ............... 308/132, 171, 172, 240, 308/79 R, 87 A, 89, 99

[56] References Cited

U.S. PATENT DOCUMENTS

| Re. 25,330 | 2/1963 | Cox | 308/88 R |
|---|---|---|---|
| 2,827,343 | 3/1958 | Cox | 308/132 |
| 3,765,734 | 10/1973 | Peterson | 308/132 |
| 3,885,176 | 5/1975 | Cunningham | 308/125 |
| 3,905,659 | 9/1975 | Renk et al. | 308/132 |
| 3,940,189 | 2/1976 | Renk et al. | 308/132 |

Primary Examiner—Lenard A. Footland
Attorney, Agent, or Firm—Richard J. Renk

[57] ABSTRACT

A bearing having a lubricant reservoir and a thrust load face wherein a lubricant transfer device is provided to transfer lubricant from the reservoir to the area of the thrust load face.

4 Claims, 15 Drawing Figures

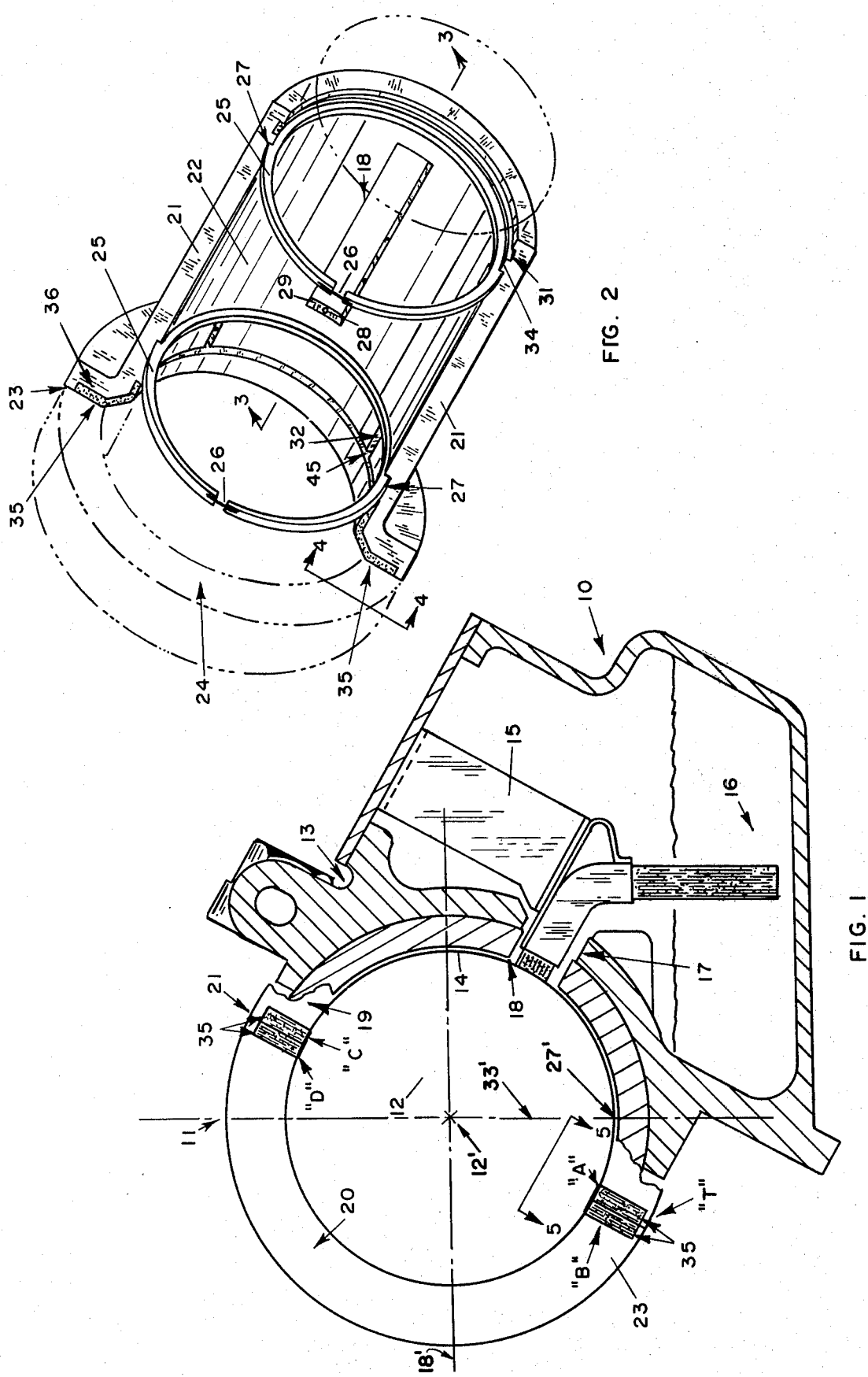

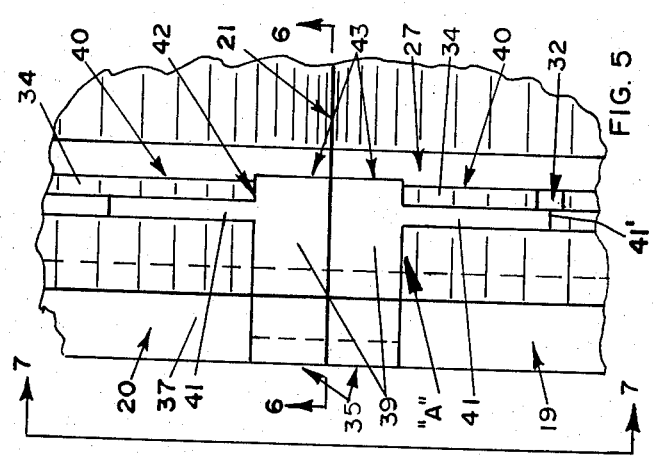
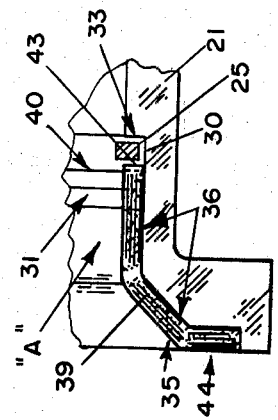
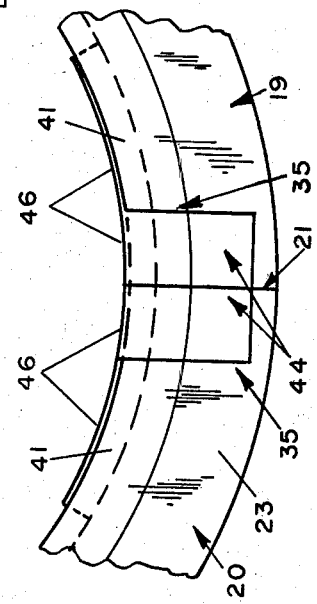
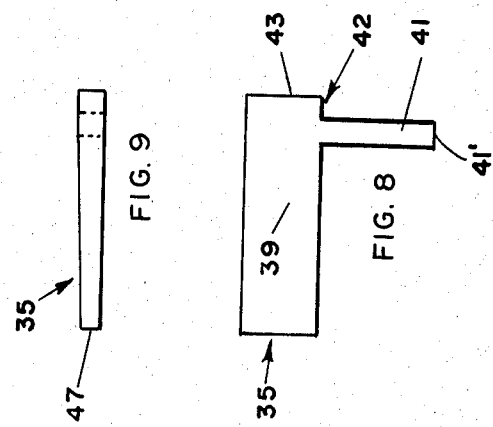
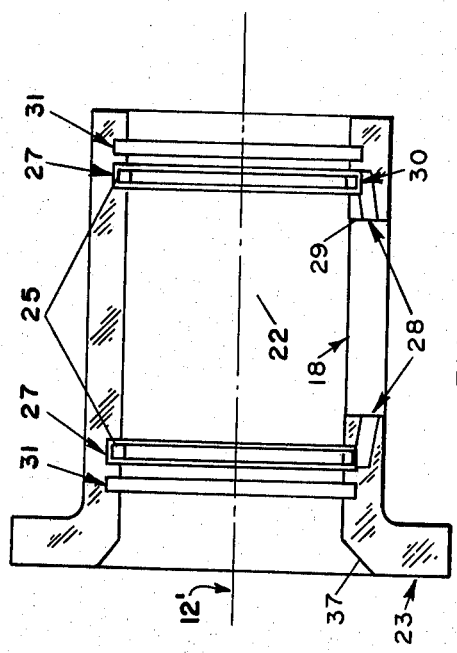
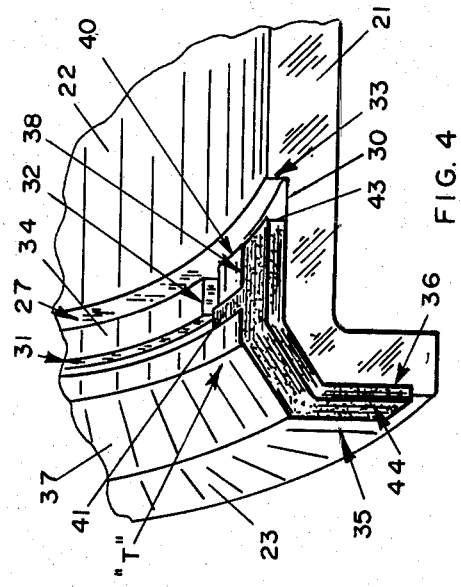

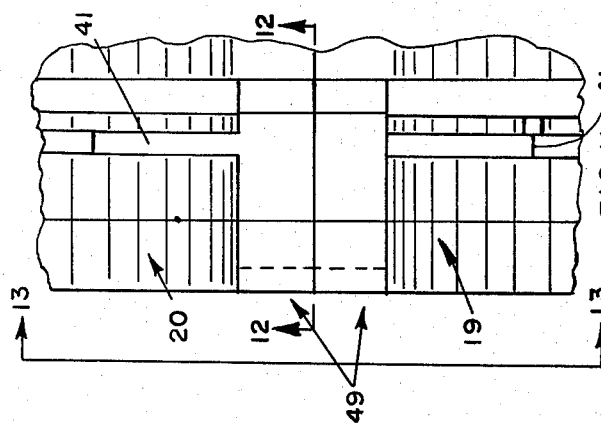
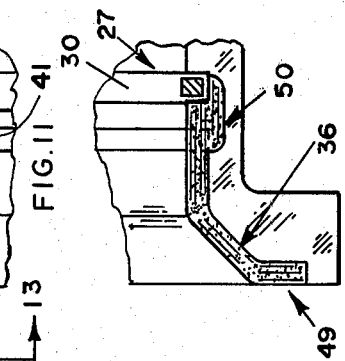
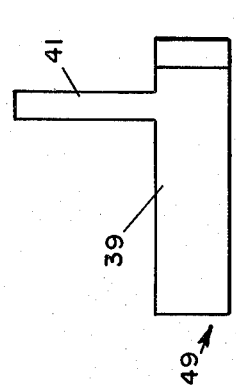
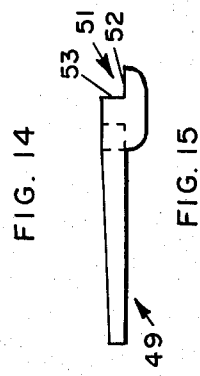
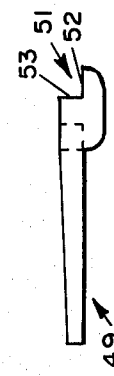
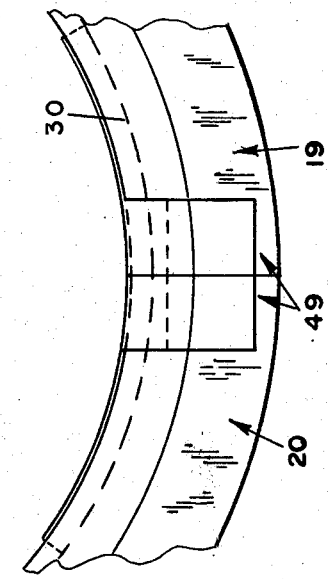
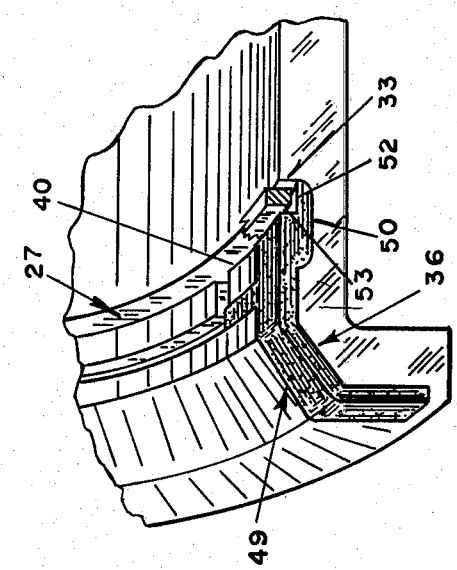

BEARINGS (BEARING THRUST LUBRICATION)

This application is a continuation of application Ser. No. 830,074 filed Sept. 2, 1977, now abandoned.

BACKGROUND OF INVENTION

The present invention relates to bearings subjected to thrust loads such as those encountered in locomotive traction motor suspension bearings as shown in U.S. Pat. No. 3,905,659, 3,940,189 and U.S. Pat. No. Re. 25,330.

While not specifically limited thereto, the invention will be described in conjunction with its use in such locomotive suspension bearings.

Suspension bearings of this type are used to support part of the weight of a driving electric traction motor on an axle of a locomotive. Lubrication is supplied to the suspension bearing by means of a lubricator.

Because of the critical nature of the suspension bearing, it is important that the supply of lubricant be conserved but yet provide sufficient lubricant to accommodate thrust loads. Up to this time, these optimum requirements have been difficult to accomplish because of the many variables involved such as cocking of the suspension bearings relative to the axle, because of gear reaction forces, because of lateral movement between the suspension bearings and the axle, and because of variances in clearances between the axle and the bearings.

SUMMARY OF INVENTION

The present invention provides an arrangement wherein excess lubricant is restricted in its flow outwardly through the ends of the bearing while a limited amount is moved to the thrust load flange. This is accomplished by the use of a lubricating system which includes a lubricant collection area of the bearing and means for moving lubricant from such area to the flange load area.

DESCRIPTION OF DRAWINGS

FIG. 1 is a fragmentary vertical section through a traction motor suspension bearing and axle cap.

FIG. 2 is a perspective view showing one half of a split bearing with one arrangement of the invention in position relative to a wheel or gear hub thrust surface (shown in phantom).

FIG. 3 is a sectional view of the whole bearing taken through a window thereof generally along lines 3—3 of FIG. 2.

FIG. 4 is an enlarged perspective view of a small portion of the bearing showing one embodiment of the thrust lubricating system of the invention as viewed generally along lines 4—4 of FIG. 2.

FIG. 5 is a partial top plan view of the thrust lubricating system taken along lines 5—5 of FIG. 1 showing thrust lubricators on both sides of the split line of a bearing.

FIG. 6 is a view taken along lines 6—6 of FIG. 5 (along the split line of the bearing) showing a side view of a thrust lubricator.

FIG. 7 is a side view of the bearing flange of FIG. 5 taken along lines 7—7 thereof.

FIG. 8 is a top plan view of one embodiment of the thrust lubricator.

FIG. 9 is a side view of the thrust lubricator shown in FIG. 8.

FIG. 10 is an enlarged perspective view generally similar to FIG. 4 showing another embodiment of the thrust lubricating system.

FIG. 11 is a partial top plan view further showing the embodiment of FIG. 10 showing thrust lubricators on both sides of a bearing split line.

FIG. 12 is a view taken along lines 12—12 of FIG. 11 (along the split line of the bearing).

FIG. 13 is a side view of the bearing flange of FIG. 11 taken along lines 13—13 thereof.

FIG. 14 is a top plan view of the embodiment of the thrust lubricator shown in FIGS. 10–15.

FIG. 15 is a side view of the thrust lubricator shown in FIG. 14.

PREFERRED EMBODIMENTS

While the invention is not limited to traction motor suspension bearings, it will be described in conjunction therewith for ease of presentation.

Referring now to the drawings, numeral 10 generally indicates a typical traction motor suspension bearing assembly. The assembly includes a split bearing liner or shell 11 which surrounds an axle or shaft 12. In service, the axle 12 has its longitudinal or rotational axis 12' disposed along a generally horizontal plane with locomotive wheels (not shown) mounted on each end thereof. The bearing 11 is clamped against the axle 12 by a portion of the traction motor casting (not shown) and an axle cap 13.

Lubricant is applied to the journal portion 14 of the axle 12 by an oiling device 15 which serves to lift a lubricant such as oil from the axle cap reservoir 16 and apply it to the journal through a generally rectangular window opening 17 in the axle cap and a corresponding window 18 in the bearing 11. In a typical application, the window opens or faces downwardly toward the reservoir 16 at about 30° from a horizontal plane 18' extending through the axial centerline 12' (FIG. 1).

The bearing 11 is of the sleeve type and formed of two complimentary halves or segments 19 and 20 (FIG. 1), which meet one another at a split line 21. The window 18 is in the bearing half 19. The two bearing halves have a common axial bearing surface or sleeve bore 22 (FIG. 2) which bears against the journal or axle and forms a first load-bearing area. The bore 22 has the same axial centerline 12' as the axle 12. A thrust flange face 23 of the bearing (FIGS. 1 and 2) is adapted to engage a laterally restraining member such as wheel-hub or gear indicated by phantom lines at 24. The thrust flange 23 thus provides a second load-bearing area.

In service, lubricant (such as oil) applied to the journal 14 is eventually squeezed axially outwardly toward both ends of the bearing and is lost. To reduce such losses, in accordance with the invention disclosed in the before noted U.S. Pat. No. 3,905,659, there is provided a member(s) 25 in the form of a rotating ring (FIGS. 2 and 3) which returns potentially lost lubricant to the reservoir 16.

As shown in FIG. 2, the member 25 may be held on the journal by the clamping effect developed by a retaining or biasing member such as a tension spring 26 (FIG. 2). The ring 25 thus rotates with the journal in a first means such as a circumferentially recessed groove 27 which opens inwardly toward the journal 14. To permit rotation of the ring, the groove 27 is larger than the ring 25 in both the axial and outer peripheral dimensions.

Oil which works outwardly into a ring groove(s) 27 (i.e. away from the window load zone toward the ends of the bearing) is carried or moved by a rotating ring 25 and deposited in a passage or drain 28 (FIGS. 2 and 3) which communicates between the bearing window 18 and a ring groove 27 (FIGS. 2–4). The passage 28 may be a substantially enclosed bore which extends from a generally vertically disposed side 29 of the bearing window 18 and intersects the ring groove 27. Preferably the passage 28 extends below the outer periphery 30 (FIG. 3) or bottom of the groove 27 (FIG. 3) and breaks out into the groove. Oil then runs through the window drain 28, through the axle cap window 17, and thence into the reservoir 16.

To further reduce lubricant losses, an additional collector means such as a groove 31 in the form of a confined trough, channel or pocket is provided axially outwardly of a ring groove 27. In other words, the collector groove 31 (second groove) is closer to an end of the bearing than its adjacent and associated ring groove 27 (first groove).

The ring groove 27 and its adjacent collector groove 31 are operatively connected by suitable means, such as a transfer channel or slot 32 (FIGS. 2 and 4), to allow lubricant which enters the collector groove 31 to move to the ring groove 27. Such lubricant can then be moved by the ring member 25 to the passage or drain 28. As shown in FIGS. 2 and 4, a very desirable position for the transfer or connecting channel 32 is at the bottommost part or lowermost part of the groove 31. With the axial centerline 12' of the axle 12 (and bearing 11) extending in a generally horizontal direction, the lowermost point of the groove or trough is at the six o'clock position of the groove indicated at 27' in FIG. 1 and is below or lower than the lowest portion of the bearing bore 22 or at the lowermost reservoir portion of the groove 31.

Thus, lubricant which does pass the ring 25 and its associated groove 27, enters the collector groove 31 and runs downwardly to the 6 o'clock position or to the bottommost transfer channel 32. It then feeds back or runs laterally in the channel 32 to the ring groove 27 and is moved upwardly to the window drain 28 by the rotating ring 25. In the case of a traction motor suspension bearing, (shown in FIG. 1), the split line 21 of the bearing is generally displaced about 30° from the vertical center line 33' which passes thru the rotational axis 12' of the bearing bore 22 and axle 12 (or at the 1 and 7 o'clock positions for example). Thus, the transfer channel 32 at the 6 o'clock position will not be at the split line although it may be varied depending on the type and arrangement of the bearing being used. In the embodiment shown in FIGS. 1 and 2, the transfer channel 32 at the lowermost or 6 o'clock position will be in approximate alignment with the vertical centerline 33'.

If bearings incorporating the features of the invention are to be used in locomotive traction motors wherein they are interchangeably used in the pinion or commutator bearing positions (reversed end for end), the transfer channels 32 may be positioned at the "six" and "two" o'clock positions. When the bearing shown in FIG. 2 is inverted to be used in the opposite bearing position, the transfer channel 32 at the two o'clock position will then be at the six o'clock position (and vis-a-vis).

In a typical installation, a ring groove 27 (first groove) and a collector groove 31 (second groove) can be positioned on each side of the bearing window 18 as shown in FIG. 2. However, in some installations one or both of the grooves 27 and 31 might be eliminated on one side or the other of the window depending on the efficiency desired.

In most applications, a traction motor is designed to allow for lateral movement between the axle 12 and the bearings 11 (which are fixedly secured to the motor). Lateral movement is generally between 1/16" to 5/16". To accommodate such movement and to keep any sliding or rubbing action of the rotating ring 25 against the ring groove sidewalls 33 (FIG. 6) to a minimum, the ring groove 27 may be formed wider (in an axial direction), than the ring 25. In other words, if the axial width of the ring is ¼", the width of the groove may be 9/16" etc. In a radial direction, a ring thickness of ¼" with a minimum clearance of 0.030" between the bottom 30 of the groove 27 and the ring has been found acceptable.

A satisfactory arrangement for the collector groove 31 is to have such groove spaced about 3/16" from the ring groove 27 by a dividing wall such as at 34 (FIGS. 4 and 5), with the width of the collector groove 31 being approximately ¼". However, other spacings and widths have been used efficiently.

During running, the ring(s) 25 rotates with the journal with no contact with the walls of groove 27 even though the traction motor with its attached bearings may move from side to side. However, contact of the ring 25 against the side walls 33 and 40 of the grooves 27 is easily accommodated as the ring is cammed or move slightly along the journal to provide a self centering action. As a further advantage, the ring spring 26 also allows the ring to slip on the journal if the ring is restrained from moving. In other words, it provides a slip-clutch effect.

Now, in accordance with the present invention, in order to provide lubrication to a thrust surface of a bearing (such as the flange 23 as it engages a hub or stop surface 24), there is provided a novel thrust lubrication system generally indicated at "T" (FIGS. 1 and 4).

The lubricating system "T" includes a lubricant transfer means 35 which cooperates with means in the bearing to provide a controlled feed of lubricant to the thrust area. As shown in FIGS. 4 and 6, the lubricating means 35 may take the form of a flange wick formed of an absorbent wicking material such as felt having a portion extending along the flange face 23. The flange wicks 35 may be positioned in elongated recesses or pockets 36 along the flange or thrust face. For traction motor applications, the recesses 36 are formed adjacent the split line faces 21 in each of the mating bearing halves. (The split line 21 shown in the typical traction motor bearing of FIG. 1 is displaced circumferentially or rotated or indexed approximately 30° with respect to the vertical centerline 33').

Recesses 36 may be machined by milling the bearing along the thrust face 23 and thence along a tapered or chamfered face 37 and thence along the bearing bore to intersect or break-out into the collector means or groove 31 FIGS. 4 and 6). The recesses 36 may continue inwardly in an axially direction along the bearing bore 22 where they extend through the dividing wall 34 between the grooves 27 and 31 as at 38 (FIG. 4) so as to intersect or communicate with the ring groove 27.

Attention is now invited to the lubricant transfer means such as flange wick 35 (FIGS. 4 to 9) wherein it is shown to be somewhat "L" shaped (FIG. 8). The flange wick has a longitudinal or main leg 39 which follows the flange recess 36 in the bearing and continues inwardly into the bearing bore to a point where it is generally in line or flush with the outer side wall 40 of ring groove 27 (FIGS. 4, 5 and 6). Extending at generally right-angles to the longitudinal leg 39 is an offset or stub-leg 41. The latter may be relatively narrower than the main leg 39 to provide controlled lubricant flow. As shown in FIGS. 4 and 7, the offset leg 41 nests in the collector means or trough-like groove 31 and follows the circumferential contour thereof. In a plan view of the flange wick 35 (FIG. 8), the main leg 39 has a projecting nose 42 extending beyond the offset leg 41 which extends through the wall 34 as at 38 (FIG. 4). In other words, the offset leg 41 may be intermediate the ends 43 and 47 of main leg 39 (FIGS. 8 and 9).

The offset leg 41 (FIGS. 4 and 5) in the window half 19 of the bearing may have its end 41' extend to a point closely adjacent to or somewhat in line with the transfer or connecting slots 32 between the ring groove 27 and the collector groove 31 in the window half 19 of the bearing. This is very desirable at the 6 o'clock or lowermost position of the bearing (when the bearing is mounted with the axle's rotational axis 12' disposed somewhat horizontally) as the lubricant tends to collect in the lowermost part of the grooves. That is, the end 41' of the offset leg 41 may extend to a point in proximity to the vertical axially centerline 33' of the bearing bore (FIG. 1).

As shown in FIG. 2, the ring groove 27 is spaced away from the window 18 and axially outwardly toward an end of the bearing. In other words, it does not axially overlap or intersect the window side 29 but is spaced axially away therefrom and terminates short of the window. As discussed hereinbefore, the collector groove 31 is spaced axially outwardly of the ring groove 27 and closer to the end of the bearing (such as the flange end). Thus, the flange wick does not take valuable lubricant away from the primary load zone of the bearing which is generally somewhat co-extensive with the window area 18 where oil is applied by the oiling device 15 (FIG. 1); this also results in excessive lubricant losses, as in prior patent concepts such as that shown in U.S. Pat. No. Re. 25,330.

In operation, the flange wick 35 can receive a lubricant, such as oil, along a face 43 of the projecting nose 42 which faces and is exposed to the ring 25. As the ring 25 rotates, oil splatter is collected by the face 43 of the flange wick and is then wicked via the main leg 39 thereof to a face 44 of the wick which is adapted to engage a hub 24. (The face 43 may also project slightly beyond the side wall 40 and into the ring groove 27 (as shown in FIGS. 5 and 6) so as to gather more oil directly from the rotating ring). The flange wick 35 can also gather oil along its offset leg 41 by virtue of oil feeding through the transfer channels 32 from ring groove 27 and also oil collecting or traveling in the collector groove 31. The offset leg 41 then wicks oil to the main leg 39 and thence to the wick face 44.

As a further feature, when a locomotive stops, some of the oil in the bearing bore 22 gradually drains toward the ends thereof and is collected or gathered in the grooves 27 and 31 and drains toward the sump or 6 o'clock position. At the flange end of the bearing the flange wick offset leg 41 (in the half of the bearing which covers or includes the 6 o'clock position such as the window half shown in FIGS. 2 and 5) makes excellent use of the oil by gathering oil from the bottom area of the collector groove, indicated generally at 45 in FIG. 2. Offset leg 41 then wicks oil to the main leg 39 and thence to wick face 44. The wick 35, including its face section 44, thereby acts as a reservoir to store oil and make oil immediately available for start-up of the locomotive.

In other words as viewed in FIG. 1, a flange wick 35 positioned at "A" in the window half of the bearing has its offset leg 41 extending downwardly toward the 6 o'clock position of the bearing. The collector groove 31 (in which the offset leg is retained) and/or the transfer slot 32 and ring groove 27 act as a sump or positive reservoir means for containing or damming the oil draining in an axial direction toward the ends of the bearing. In other words, the collector groove acts as a trough and extends transversely to the axial orientation of the bearing bore 22.

Oil is thus trapped and confined and cannot drain out of the bearing (because of the channel or trough effect of the collector groove 31) unless a portion of it is wicked upwardly by the flange wick 35 indicated at "A" in FIG. 1. On the end of the bearing opposite the flange, any oil which has drained thereto is retained in the various grooves 27, 31, and slot 32, etc. and stored until the ring 25 again rotates with the axle and moves the oil to the drain 28. Thus, oil conservation is achieved by restricting drainage out of the ends of the bearing, but yet limited controlled feed is provided to the flange wick face 44 by causing oil to wick "up-hill" through the offset leg 41. In other words, oil cannot easily drain out of the bearing at its lowermost or 6 o'clock position.

In prior art concepts where a flange wick is provided at the approximate 6 o'clock position, once the wick becomes saturated, oil begins to drain through or run over the wick and most all of the oil is lost. Likewise, with conventional flange wicks displaced circumferentially with respect to the vertical centerline of the bearing bore, oil often times never reaches the flange wicks but drains out of the bearing at the approximate 6 o'clock position.

Inasmuch as a locomotive stops or comes to rest at least once every 1 to 2 hours because of crew changes, side-track stops, switching, etc. the amount of oil lost when at a stand-still due to end drainage can be significant over the period of a day. Programmed over a week or a month such losses can be substantial. (Oil losses which occur during actual running are of course reduced by the rotating oil ring 25 as discussed hereinabove with controlled oil feed being provided by the flange wick 35.)

Any oil which is not required to wet the flange wick during a locomotive stoppage is retained in the grooves 27, 31, etc. and returned to the reservoir 16 when the ring member 25 again rotates thereby returning the oil through the drain 28.

It will be observed that the window half of the bearing of FIG. 2 shows the bearing inverted or reversed as relates to FIG. 1 and shows the bearing as it would appear on the pinion side of a locomotive traction motor. FIG. 1 shows the bearing as it appears on the commutator side of the traction motor. The bearing on the pinion end is reversed with respect to the bearing on the commutator end; the transfer slot 32 between the grooves 27 and 31 appearing at the 6 o'clock position on the pinion end will then appear at the 2 o'clock position on the commutator end and vis-a-vis. In each case, when the split line of the window half of the bearing is shifted from the vertical centerline 33' of the axle, the flange wick offset leg 41 extends away from the split-line toward a transfer slot 32. The latter are displaced circumferentially away from the bearing split-line 21 and toward the window 18. On the back half 20 of the bearing, the offset leg 41 in the collector groove 31 also extends away from the split line 21.

Another feature of the flange wick 35 is shown in FIG. 7 wherein a portion of wick may project into or above the bearing bore 22 as at 46 so as to contact the shaft or journal 12. The elevated area 46 is generally in cirumferential alignment with the offset legs 41. This has the advantage of wicking oil from the lower and wetter flange wicks "A" and "B" (FIG. 1) at the lower sump position of the grooves 27, 31, 32, etc. and applying it to the axle. Oil applied to the axle by wetter wicks "A" and "B" is thus wiped off of the axle by corresponding contact areas 46 of upper flange wicks "C" and "D" and then wicked to the flange faces 44 of the latter. Oil is thereby transferred from a lower flange wick to a higher flange wick by means of rotation of the axle.

A typical form of the flange wick 35 is shown in FIGS. 9 and 8 wherein the longitudinal or main leg 39 may be tapered (with a reduced cross-sectional thickness) as it extends along the face of 23 the thrust flange and ending at its lower tip 47. To assure good transfer of lubricant to a thrust hub 24, the lower face 44 of the flange wick may extend or project slightly beyond the face 23 of the bearing flange.

To vary the amount of lubricant to the flange, the length of the offset legs 41 may be varied. The closer an offset leg 41 (in the position of wick "A" in FIG. 1) extends to the 6 o'clock position, the deeper or lower it will enter the bottom or sump area of the grooves 27 and 31 and the greater the amount of lubricant it will be able to utilize. Thus a means of varying the amount of lubricant moved by the flange wick 35 is provided. Likewise, the amount of lubricant fed to the flange wick can also be controlled by size of the transfer or cross channel 32 between the grooves 27 and 31.

As viewed in FIGS. 1 and 2, a flange wick 35 may be positioned at the top and bottom of split line 21 (1 and 7 o'clock positions) in each of the bearing halves 19 and 20. The wicks may also be positioned adjacent one another on opposite sides of the split line 21. In this arrangement, the offset legs 41 extend in opposite directions from one another along the groove 31.

A further embodiment of the invention is shown in FIGS. 10-15 which differs from the embodiment of FIGS. 1-9 by having a flange lubricating means 49 extend under (i.e. below) the outer periphery of 30 the ring groove 27 so as to gather additional lubricant from the seal ring 25 for distribution to the flange. As shown in FIGS. 10 and 12, the recess 36 in the flange in which the flange wick 49 is nested is machined to a deeper pocket 50 at its end so as to extend beyond and intersect the periphery of the bottom wall 30 of the ring groove 27. The lubricating means 49 is then notched or deformed as at 51 (FIGS. 10 and 15) to provide a bottom 52 somewhat conforming to the ring groove bottom 30 and also to have a side 53 in general alignment with the groove side wall 40.

As before, the flange wick embodiment 49 may have an offset leg 41. By having the bottom wall 52 of the flange wick 49 extending beyond and being exposed to the outer periphery of the ring 25, rotation of the ring tends to drag lubricant past the wall 52 and thereby provide additional lubricant feed to the wick. Thus, in addition to having the side wall 53 of the flange wick 49 exposed to and receive lubricant from the ring 25, an additional quantity of lubricant which is being moved toward the window drain hole 38 will be absorbed by flange wick bottom 52 and then transferred to the flange wick face 44.

While thrust or flange lubricator concepts have been proposed in the past, they have not been concerned with efficient use and conservation of lubricants. For example in U.S. Pat. No. Re. 25,330, it was desired that end oil leakage occur and excessive oil consumption resulted where a felt strip was incorporated in a cylindrical open step-bore at the flange end of a bearing. After the felt became saturated to the limit of its holding ability, oil drained out at the 6 o'clock or lowermost point of the bearing. In another embodiment in such patent, where the flange wicks were disposed in axially extending strips along the split lines of the bearing (displaced from the vertical centerline of the bearing), oil never reached the flange wicks in certain directions of axle rotation and load direction.

In addition in the embodiments of U.S. Pat. No. Re. 25,330, excessive oil consumption also resulted because the wicks extended axially inwardly to where they overlapped the window of the bearing where oil was being applied to the primary load area of the journal. In short, the prior patents desired end leakage and were not concerned with lubricant conservation.

In U.S. Pat. No. 3,940,189 excessive flange wear resulted because the lubricant was not supplied to the flange in the required amounts and/or drained out of the bearing at the 6 o'clock position in the case of the gravity flange drain feed shown therein. The present invention in locomotive service achieved an approximate 10:1 advantage in reduced flange wear over that achieved by the U.S. Pat. No. 3,940,189.

In summary the flange lubricating system of the present invention enables the benefits of the seal ring to be achieved such as a reduction in oil losses and dirt entry, while at the same time permits a controlled amount of lubricant to be fed to the thrust load areas of a bearing.

While flange wicks 35 and 49 are shown adjacent one another on opposite sides of the bearing split line (both at the top and bottom of the bearing, at approximately the 1 o'clock and 7 o'clock positions as viewed in FIG. 1), they may be positioned in other locations, and in some instances a fewer number of wicks may be found more desirable. Also, for some applications to reduce lubricant feed it may be desirable to have the nose 42 of the flange wick stop short of the ring groove, etc.

Likewise, for other applications the ring member 25 may be omitted from the flange end of the bearing. Nevertheless, the flange wicks 35 etc. will still provide very substantial advantages. Lubricant which would normally run out of the bearing at the 6 o'clock position will instead collect in collector groove 31 and be conserved. The flange wicks 35 can then be kept supplied with a lubricant through their offset leg 41 to provide lubricant for start-up and running to thereby provide better operating performance. Bearings incorporating the concepts of the invention under field testing have shown very substantial improvement in lubricant conservation and flange wear.

I claim:

1. A bearing for use with an assembly wherein a rotatable member can be carried on a somewhat horizontally disposed shaft to reduce lubricant losses through said bearing comprising, a bearing body having an arcuate bearing surface defining an axial sleeve bore portion adapted to engage a surface of said shaft with said bore having its axial centerline extending somewhat horizontally with the axis of rotation of said shaft, said bearing having a window opening therein through which lubricant can be introduced to said shaft, a radially projecting thrust face at an end of said bearing which is adapted to engage a thrust surface, said bearing body having a first groove formed circumferentially in the periphery of said bearing surface into which said rotatable member can extend when mounted for rotation with said shaft, said first groove being spaced axially outwardly from said window and located between said window and said thrust face, said bearing body also having a confined collector groove in the periphery of said bearing surface having a lowermost area below said bearing surface in which a lubricant may collect, said collector groove being positioned between said first groove and said thrust face and being spaced from said first groove by a wall extending transversely to the axial direction of said bearing bore so as to provide a positive reservoir area for collecting lubricant draining in an axial direction toward said thrust face, connecting means in said wall operatively coupling said first groove and said collector groove together in proximity to said lowermost area of said collector groove so some of said lubricant can move between said first groove and said collector groove, said bearing also having a recess therein which opens at the thrust face thereof and which communicates with said collector groove and extends through said wall to said first groove at a point above the lowermost point of said collector groove, said recess being displaced from a vertical centerline passing through said rotational axis of said shaft and above said lowermost point of said collector groove, and lubricant transfer means in said recess for receiving and moving lubricant from both said first groove and collector grooves toward the thrust face for use in lubricating the thrust face, said lubricant transfer means having a main leg in said recess and an offset leg which extends circumferentially in said collector groove toward said connecting means between said first and said collector grooves to gather lubricant therefrom and move it to said main leg for use in providing lubricant to said thrust face, said main leg also having a portion exposed to said recess area in said wall between said collector groove and said first groove to enable said main leg to receive lubricant from said first groove and said rotatable member during rotation of said member by said shaft, said main leg extending at an angle to said offset leg and terminating short of intersecting or overlaping said window opening.

2. A bearing as claimed in claim 1 wherein said main leg of said lubricant transfer means has a projection extending past said offset leg and along said recess in said dividing wall between said first groove and said collector groove to enable said projection to receive lubricant from said first groove and said rotatable member.

3. A bearing as claimed in claim 1 wherein said main leg of said lubricant transfer means is displaced with respect to the vertical centerline of said bearing bore, and wherein said offset leg in said collector means extends downwardly a partial distance therein toward said vertical centerline and toward said lowermost area of said collector groove so as to be in proximity to said connecting means in said dividing wall to receive lubricant passing through said connecting means from said first groove.

4. A bearing as claimed in claim 1, characterized by said bearing body being of the split type having axially extending split lines along which the bearing segments meet one another and said recess in said bearing extends on opposite sides of said split line, wherein a lubricant transfer means is provided in each bearing segment adjacent one another at said split line, and wherein the offset legs of adjacent lubricant transfer means are narrower than the main leg of their respective lubricant transfer means, and said offset legs extend circumferentially in opposite directions from one another a partial length of said collector groove in each of said segments and away from said split line.

* * * * *